United States Patent [19]

Nakagawa et al.

[11] Patent Number: 4,839,208
[45] Date of Patent: Jun. 13, 1989

[54] OPTICAL INFORMATION RECORDING MEDIUM

[75] Inventors: Katsuji Nakagawa; Masaki Itoh; Akio Morimoto; Mitsuru Sakai, all of Tokyo, Japan

[73] Assignee: NEC Corporation, Japan

[21] Appl. No.: 43,626

[22] Filed: Apr. 28, 1987

[30] Foreign Application Priority Data

| Apr. 30, 1986 | [JP] | Japan | 61-101368 |
| Apr. 30, 1986 | [JP] | Japan | 61-101370 |
| May 27, 1986 | [JP] | Japan | 61-122686 |
| May 27, 1986 | [JP] | Japan | 61-122687 |
| Jun. 17, 1986 | [JP] | Japan | 61-141739 |
| Jul. 4, 1986 | [JP] | Japan | 61-158247 |
| Jul. 4, 1986 | [JP] | Japan | 61-158248 |
| Jul. 23, 1986 | [JP] | Japan | 61-174495 |
| Jul. 23, 1986 | [JP] | Japan | 61-174496 |
| Jul. 23, 1986 | [JP] | Japan | 61-174497 |
| Jul. 23, 1986 | [JP] | Japan | 61-174498 |
| Aug. 19, 1986 | [JP] | Japan | 61-194560 |
| Sep. 25, 1986 | [JP] | Japan | 61-227652 |
| Dec. 16, 1986 | [JP] | Japan | 61-300793 |
| Jan. 19, 1987 | [JP] | Japan | 62-8137 |

[51] Int. Cl.⁴ .......................... B32B 3/02; G11B 5/84; G01D 15/10
[52] U.S. Cl. ......................................... 428/64; 428/65; 428/688; 428/689; 428/697; 428/698; 428/699; 428/704; 428/913; 428/333; 428/141; 369/288; 346/766; 346/135.1
[58] Field of Search ................. 428/65, 688, 689, 697, 428/698, 699, 704, 64, 913, 220, 333, 141; 430/945; 427/43.1; 369/288; 346/762, 135.1

[56] References Cited

U.S. PATENT DOCUMENTS

| 4,509,161 | 4/1985 | Van de Leest et al. | 430/945 |
| 4,565,772 | 1/1986 | Takeoka et al. | 430/290 |
| 4,668,573 | 5/1987 | Terao et al. | 428/688 |
| 4,670,345 | 6/1987 | Morimoto et al. | 428/411.1 |

FOREIGN PATENT DOCUMENTS

| 0075896 | 5/1982 | Japan | 427/43.1 |
| 0142894 | 8/1983 | Japan | 427/43.1 |
| 0158053 | 9/1983 | Japan | 427/43.1 |
| 1086287 | 5/1986 | Japan | 428/688 |
| 11685 | 1/1987 | Japan | |

Primary Examiner—Ellis P. Robinson
Assistant Examiner—P. J. Ryan
Attorney, Agent, or Firm—Laff, Whitesel, Conte & Saret

[57] ABSTRACT

An optical information recording medium according to the present invention is featured by its recording layer which contains a compound of tellurium (Te), selenium (Se) and nitrogen (N). The thickness of the recording layer 2 favorably ranges from about 100 angstroms (Å) to about 1000 Å and more favorably from 180 Å to 400 Å. The content of Se in the recording layer 2 favorably lies within a range from 2 to 40 atomic percent, more favorably from 10 to 30 atomic percent. The content of N is favorably to be from 2 to 20 atomic percent, and more favorably from 2 to 10 atomic percent.

17 Claims, 1 Drawing Sheet

OPTICAL INFORMATION RECORDING MEDIUM

BACKGROUND OF THE INVENTION

The present invention relates to an optical information recording medium used for recording information in the form of a series of pits formed by a laser beam, and more particularly, to an improved material for use as an optical-information recording layer.

The optical information recording medium, such as an optical disk, has an advantage of storing a large capacity of information owing to its high storage density. The recording medium includes at least a substrate and a recording layer of a low-melting point material disposed on the substrate. As the material of the recording layer, tellurium (Te) or its compound was proposed in U.S. Pat. Nos. 3,971,874 (Ohta et al), 4,373,004 (Asano et al), 4,385,376 (Takaoka et al) and 4,433,340 (Mashita et al). Another example of materials for the recording layer was tellurium-selenium (Te-Se) alloy which is disclosed in U.S. Pat. Nos. 4,214,249 (Kasai et al), 4,238,803 (Terao et al), 4,348,461 (Terao et al), 4,385,305 (Terao et al) and 4,434,429 (Terao et al).

From the viewpoint that pits formed in the recording layer have a good shape, Te or Te-Se alloy is preferable owing to its low surface tension. However, a large power is necessary for the Te or Te-Se alloy recording layer to open a pit therein and therefore Te or Te-S has not been fully acceptable for achieving high degrees of recording sensitivity and a recording power margin.

Further, it is required for the recording medium for use in an optical information recording and reading system to prevent the excessive expansion of the size of the pit formed in the recording layer during a recording operation, in order that the focusing and tracking servo systems included in the recording and reading system operate stably. However, the pit size becomes inevitably large in the recording layer since high laser power is required to form the pit in the Te or Te-Se recording layer. This results in a difficulty in providing high stability in operation of the servo systems.

SUMMARY OF THE INVENTION

Accordingly, an object of the present invention is to provide an optical information recording medium having a high degree of recording sensitivity.

Another object of the present invention is to provide an optical information recording medium having a great recording power margin so that a pt can be formed without excessive expansion in a recording layer by a recording laser beam.

Still another object of the present invention is to provide an optical information recording medium whose optical characteristic is stable for a long time.

An optical information recording medium according to the present invention is featured by its recording layer which contains a compound of tellurium (Te), selenium (Se) and nitrogen (N).

The thickness of the recording layer 2 favorably ranges from about 100 angstroms (Å) to about 1000 Å and more favorably from 180 Å to 400 Å. The content of Se in the recording layer 2 favorably lies within a range from 2 to 40 atomic percent, more favorably from 10 to 30 atomic percent. The content of N is favorably to be from 2 to 20 atomic percent, and more favorably from 2 to 10 atomic percent.

In a preferred embodiment of the present invention, the recording layer of the Te-Se-N compound is crystallized. The recording layer may further contain at least one element selected from a group consisting of Pb, As, Sn, Ge, Cd, Tl, Sb, S, P, In, Ga, Zn, Bi, Al, Cu, Ag, Mg, Ta, Au, Pd, Ti, Zr, Hf, Ru, Rh, Os, Ir, Pt, Ni, Co and Fe up to 20 atom %. An intermediate layer may formed between the substrate and the recording layer, which contains at least one compound selected from a group consisting of an oxide, a nitride, a sulfide, a fluoride, a carbide, a boride, a Co alloy, a metal lower oxide, a mixture of metal and oxide and an organic compound.

The recording layer of the optical information recording medium according to the present invention may be formed on a substrate by sputtering Te and Se or Te-Se alloy onto the substrate in an inert atmosphere containing nitrogen (N) gas.

Owing to explosiveness of Te nitride and Se nitride, a temperature at which the pit formation starts by irradiation of a laser beam is lowered. Accordingly, the recording layer of Te-Se-N compound of the present invention has higher recording sensitivity than the recording layer of Te or Te-Se alloy.

DESCRIPTION OF THE PREFERRED EMBODIMENT

Figure 1:
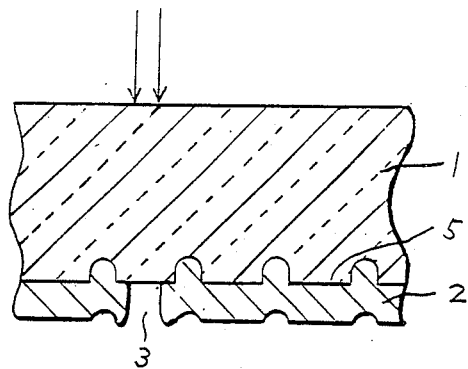
FIG. 1 is a sectional view showing a structure of an optical recording medium according to an embodiment of the present invention.

FIG. 1 shows a basic structure of an optical information recording medium according to the present invention which comprises a transparent substrate 1 and a recording layer 2 formed on one surface of the substrate 1. A recording laser beam emitted from a semiconductor laser device is applied through the substrate 1 and is focused on the recording layer 2. The laser beam heats the portion of the recording layer 2 which is accordingly melted and evaporated to form a pit 3.

The substrate 1 is made of transparent material such as polycarbonate, polyolefine, polymethylpentene, acrylic resin, and epoxy resin or glass and is in the form of a circular disk. The substrate 1 is provided with coaxial or spiral guide grooves 5 along which the laser beam is to be incident during recording and reading operations. The guide grooves 5 are about 0.3 μm to 1.3 μm wide, which is approximately equal to the diameter of the focussed laser beam, and have depths equal to one twelfth to one fourth of the wavelength of the laser beam.

When the laser beam is focussed on one of the guide grooves, the beam is diffracted in the groove. If the spot of the beam incident on the substrate 1 happens to deviate radially from the particular groove, the space distribution of the intensity of the diffracted beam is changed. Focusing and tracking servo system of a recording and reading apparatus is arranged to detect such a change in the space distribution of light intensity and controls the beam to be correctly directed at the center line of the guide groove. The recorded information is read out from the recording medium by a reading laser beam which has weaker power than the recording laser beam. The reading laser beam is so irradiated as to follow the center line of the guide groove and the presence or absence of the pits is detected in accordance with the intensity change of the reflected beam of the reading laser beam, as well known in the art.

The recording layer 2 contains a compound of tellurium (Te), selenium (Se) and nitrogen (N). The thickness of the recording layer 2 favorably ranges from about 100 angstroms (Å) to about 1000 Å and more favorably from 180 Å to 400 Å for the reason discussed later. The content of Se in the recording layer 2 favorably lies within a range from 2 to 40 atomic percent, more favorably from 10 to 30 atomic percent. The content of N is favorably to be from 2 to 20 atomic percent, and more favorably from 2 to 10 atomic percent. The Te-Se-N compound is favorably crystallized to form crystal grains which have 0.1 μm or less in diameter.

1st EMBODIMENT

A centrally apertured transparent disk substrate 1 of polycarbonate resin was prepared which has been provided with guide grooves and was measured 15 mm in inside diameter, 130 mm (5.25 inches) in outside diameter and 1.2 mm in thickness. The substrate 1 was placed in the chamber of a magnetron sputtering apparatus, having a radio frequency power supply of 13.56 MHz, opposite to a sputtering target of Te-Se sintered alloy having 80 atomic percent Te and 20 atomic percent Se.

The inside of the chamber was evacuated to less than $1 \times 10^{-6}$ Torr and then was supplied with argon (Ar) gas and nitrogen ($N_2$) gas until the inside pressure of the chamber was $1 \times 10^{-2}$ Torr. The partial pressure and flow rate of the $N_2$ gas were 0.26 percent and 0.3 SCCM (Standard Cubic Centimeter per Minute), respectively, and the flow rate of the mixture of the Ar gas and $N_2$ gas was 115 SCCM. The recording layer 2 of Te-Se-N compound and was formed on the substrate 1 to a thickness of about 220 Å by sputtering the target of Te-Se alloy to the substrate 1 within the mixture of the Ar gas and $N_2$ gas with a sputtering power of 100 W. The contents of the Te, Se and N in the recording layer 2 were about 77, 19 and 4 atomic percents, respectively. Next, the recording layer 2 was crystallized by exposing the layer in air of 85° C. in temperature and 90 percent in humidity for 12 hours. A single-layer optical information recording disk including a recording layer 2 of crystallized Te-Se-N compound was thus obtained.

Recording and reading characteristics of the optical recording disk were measured in the following manner. A set of information were recorded into the optical disk with a succession of pits formed in the recording layer 2 of the disk along the guide grooves 5 in the substrate 1 by irradiation of the disk with a recording laser beam emitted from a semiconductor laser device having a wavelength of 830 nm. The recording laser beam had the recording frequency of 3.77 MHz, recording pulse width of 70 nsec and recording power of 7.5 mW. The disk was driven for rotation at a circumferential speed of 5.65 m/sec. The recording laser beam was applied to the back surface of the substrate 1 and focussed through the substrate 1 on the recording layer 2 to have a diameter of about 1.6 μm to form a pit 3 of 1 μm in diameter. In reading operation, a reading laser beam was applied to back surface of the substrate 1 along the guide grooves 5 to detect the pit 3. The reading laser beam has the wavelength of 830 nm and constant power of 0.7 mW, and was also irradiated to the recording layer 2 through the substrate 1.

The reflectivity of a land portion (a portion without pit) of the recording layer 2 was about 35 percent, while that at the pit was about 0 percent. The carrier-to-noise ratio (C/N ratio) within the bandwidth of 30 KHz showed a stable value of 50 dB. The variance of the C/N ratio was small in many sample disks. The C/N ratio was not changed even if the recording laser power was varied in a certain range, which means that the disk has a large recording power margin. The bit error rate (BER) of about $1 \times 10^{-6}$ was stably obtained, which denoted a high reliability of the pit formation.

Thus, the optical disk is suitable to be used an optical information recording and reading apparatus, including a semiconductor laser device because of its high optical sensitivity, high C/N ratio and large record power margin.

The relationships between the content of N in the recording layer 2 and the optical recording sensitivity, BER, C/N ratio and the stability of tracking servo were measured. The results are shown in the following Table 1.

TABLE 1

| Sample No. | N (atomic %) | Record Power (mW) | BER | C/N (dB) | Stability of Tracking Servo |
|---|---|---|---|---|---|
| 1-1 | 0 | 9.0 | more than $5 \times 10^{-5}$ | 40 | bad |
| 1-2 | 2 | 8.0 | about $10^{-6}$ | 51 | good |
| 1-3 | 4 | 7.5 | about $10^{-6}$ | 50 | good |
| 1-4 | 10 | 6.0 | about $10^{-6}$ | 46 | good |
| 1-5 | 20 | more than 10.0 (not recorded) | not measured | not measured | not measured |

The conventional recording medium in which N is not contained in the recording layer of Te-Se alloy (sample 1-1) has low optical recording sensitivity and the recording laser power of 9 mW is required to form the pits in the recording layer. Pits are sometimes failed to be formed and therefore the BER value is large. Moreover, pits formed do not have uniform shape and size, and the C/N ratio is low. If the recording power is more increased, high C/N ratio can be obtained but it degrades the stability of the tracking servo. Further, BER changes with the little variance of the intensity of the recording laser power due to its low recording power margin. The reason is that the recording layer of Te-Se alloy without N requires a large intensity of recording laser power to start the pit formation in the recording layer. Moreover, once the pit formation is initiated, the size of the pit immediately becomes large due to the large intensity of the recording laser power and its low melting point. As a result, the stability of the tracking servo is degraded since the amount of the reflected laser beam from the recording layer is relatively little.

The recording layers of samples 1-2, 1-3 and 1-4 have a recording layer in which a part of Te and Se are nitrified to have the content of N of 2, 4 and 10 atomic percent, respectively. In these recording layers, the pit formation is initiated with a small intensity of recording laser power owing to the explosiveness of Te nitride and Se nitride. Accordingly, the recording layers have high recording sensitivity, and the information is surely recorded by the recording laser power of 8.0 mW, 7.5 mW and 6.0 mW, respectively, so that a lower BER of about $10^{-6}$ is obtained. The C/N ratios of samples 1-2, 1-3 and 1-4 are as high as 51 dB, 50 dB and 46 dB, respectively, and are not varied with change of about ±0.2 mW in the recording laser power. This means that the recording power margin of the recording layers is sufficiently large for practical use. Since the size of the pit is not excessive owing to the high recording sensitivity, the stable tracking servo can be carried out.

When the content of N in the recording layer is larger than 10 atom %, the surface of the recording layer becomes rough and C/N ratio tends to be lowered. Moreover, the recording sensitivity is also degraded. The recording layer of sample 1-5 has a content of N of 20 atomic percent. In that layer the pit cannot be formed by the recording power of 10.0 mW. Accordingly, the content of N in the recording layer of Te-Se-N compound is desirably in a range from 2 to 10 atomic percent.

The content of N in the recording layer can be changed by controlling the partial pressure of $N_2$ gas in the inert gas (mixture of Ar gas and $N_2$ gas) and/or by controlling the flow rate of the mixture gas supplied to the chamber of the sputtering apparatus in which Te-Se alloy of 80 atomic percent Te and 20 atomic percent Se is employed as a sputtering target. As described previously, the partial pressure of $N_2$ gas is set at 0.26% and the flow rate of the mixture gas is at 115 SCCM in order to obtain the recording layer of Te-Se-N compound containing 4 atomic percent N. Without changing the flow rate of the mixture gas, in order to obtain the recording layer containing 2 atomic percent N (sample 1-2), the partial pressure of $N_2$ gas may be set at 0.13%. Similarly, to obtain the recording layer containing 10 atomic percent N (sample 1-4), the partial pressure of $N_2$ gas may be set at 0.65%. According to experiments done by the inventors of the present invention, the mixture gas uniformly flows in the chamber of the sputtering apparatus by setting the flow rate of the mixture gas at more than 20 SCCM to reduce the variation of quality of the recording layer. Under this condition, the partial pressure of $N_2$ gas may be set at less than 1%.

By crystallizing the recording layer of Te-Se-N compound, the recording power margin is further improved so that C/N ratio and BER are unchanged even if the recording laser power is changed in a range of ±0.5 mW from the value shown in Table 1. One reason of the improvement is that the pit forming is easily started owing to the uniformity of the crystal grains of Te-Se-N compound. The other reason is that the excessive expansion of the pit in the recording layer is prevented by the boundary of the crystal grains. Since the recording layer of Te-Se-N compound is crystallized by holding in the atmosphere of high temperature and high humidity in the preferred embodiment, the surface of the recording layer is slightly oxidized so that the excessive expansion of the pit is further prevented. The same effect can be obtained by making the content of N in the surface of the recording layer be increased.

Further, the crystallization of the recording layer of Te-Se-N compound has a effect that the optical characteristics of the recording medium is kept constant for a long time, i.e., the weatherproofness of the recording medium is increased.

The accelerative deterioration test was made to the optical disk of the preferred embodiment under the condition of high temperature of 60° C. and high humidity of 90% for a thousand hours. After the test, the optical characteristics including the optical reflectivity, C/N ratios, recording sensitivity and BER were unchanged. Additionally, the other deterioration tests were made under the condition of higher temperature of 80° C. and humidity of 90% for three thousand hours and under the condition of much higher temperature of 85° C. and humidity of 90% for two thousand hours. As a result, the information could correctly be recorded in the tested optical disk by the recording laser beam having the recording power of 7.5 mW and BER was kept in preferable value of less than $5 \times 10^{-5}$.

The best manner to crystallize the recording layer of Te-Se-N compound is to hold the recording medium in an atmosphere of high temperature and high humidity as described previously. The temperature should be set at as high as possible, but by which the substrate of the recording medium is not deteriorated, in order to shorten the crystallizing process period of time. In the case that polycarbonate resin is used as the substrate, the temperature of in a range from 70° C. to 95° C. and the humidity of in a range from 80% to 95% are preferable.

When thickness of the recording layer of the optical disk according to the 1st embodiment is changed, the recording laser power required for information recording and C/N ratios are also changed as shown in following Table 2.

TABLE 2

| Sample No. | Recording Layer Thickness (Å) | Record Power (mW) | C/N (dB) |
|---|---|---|---|
| 2-1 | 150 | 5.5 | 44 |
| 2-2 | 180 | 6.5 | 49 |
| 2-3 | 220 | 7.5 | 50 |
| 2-4 | 270 | 8.0 | 49 |
| 2-5 | 320 | 9.0 | 47 |
| 2-6 | 400 | 10.0 | 46 |

As represented by sample 2-1, the recording layer becomes more sensitive when the thickness of the recording layer becomes thinner. However, C/N ratios is degraded since the pit configuration becomes ununiform and the reflectivity of the recording layer is lowered. On the other hand, when the thickness of the recording layer is made large as represented by sample 2-6, a large recording power is required for recording. Further, the pit configuration is degraded so that C/N ratios is lowered since a large amount of the recording layer is melted by the recording laser beam to form the pit. Accordingly, the thickness of the recording layer is preferable in a range from 180 Å to 400 Å.

The following Table 3 shows relationships between the content of Se in the recording layer of Te-Se-N compound, and surface roughness of the recording layer and deterioration occurrence period of time in the accelerative deterioration test under the condition of temperature of 85° C. and humidity of 90%.

TABLE 3

| Sample No. | Se (atomic %) | Surface Roughness | Deterioration Period (hour) |
|---|---|---|---|
| 3-1 | 0 | good | less than 12 |
| 3-2 | 5 | good | about 60 |
| 3-3 | 10 | good | about 400 |
| 3-4 | 19 | good | more than 2000 |
| 3-5 | 30 | good | more than 2000 |
| 3-6 | 38 | no good | not measured |

The content of Se in the recording layer can be changed by adjusting the content of Se in the sputtering target of Te-Se alloy, and it is substantially equal to the content of Se in the sputtering target. When the content of Se in the recording layer is too little as represented by samples 3-1 and 3-2, the deterioration of the recording layer rapidly occurs. When the content of Se is too much as represented by sample 3-6, the surface roughness of the recording layer is degraded because of the recesses of a few μm in size generating in the recording layer in the sputtering process, with the result that the C/N ratio is decreased. Therefore, the content of Se in the recording layer is favorably in a range from 10 atomic percent to 30 atomic percent.

2nd EMBODIMENT

The recording layer of Te-Se-N compound of the 1st embodiment can further be improved in C/N ratio by adding to the recording layer at least one element selected from a group consisting of Pb, As, Sn, Ge, Cd, Tl, Sb, S, P, In, Ga, Zn, Bi, Al, Cu, Ag, Mg, Ta, Au and Pd. These metal additives enable the pit shape to be better. The content of these metal additives is preferably less than 20 atomic percent.

For instance, the recording layer of Te-Se-N-Pb compound was fabricated in the following manner. Te-Se alloy provided with Pb tips was prepared in the sputtering apparatus as a sputtering target. By sputtering the target onto the substrate under the same condition as the 1st embodiment, the recording layer of 86 atomic percent Te, 4 atomic percent Se, 6 atomic percent N and 4 atomic percent Pb was formed on the substrate. The recording layer of 250 Å thick was crystallized in the same manner as the 1st embodiment.

The recording and reading operations were made in the same manner as the 1st embodiment. As a result, C/N ratio of 55 dB was obtained, which is 5 dB higher than the 1st embodiment.

3rd EMBODIMENT

The recording layer of Te-Se-N compound of the 1st embodiment can further improved in the recording power margin by adding in the recording layer at least one element selected from a group consisting of Ti, Zr, Hf, Ru, Rh, Os, Ir, Pt, Ni, Co and Fe. These metal additives prevent the excessive expansion of the pit formed in the recording layer by the recording laser beam. The content of the metal additives is preferably less than 20 atomic percent.

The above metal additives can be compounded in the recording layer by providing the desired metal additive on the sputtering target of Te-Se alloy, similarly to the 2nd embodiment. For instance, the recording layer of Te-Se-N-Ti compound and 250 Å thick whose content is 72 atomic percent Te, 18 atomic percent Se, 4 atomic percent N and 6 atomic percent Ti is formed on the substrate by sputtering the target of Te-Se-Ti alloy onto the substrate under the same condition as the 1st embodiment. Similarly, the recording layer of Te-Se-N-Ru compound and 250 Å thick whose content is 74 atomic percent Te, 19 atomic percent Se, 4 atomic percent N and 3 atomic percent Ru can be formed by sputtering the target of Te-Se-Ru alloy. Additionally, the recording layer of Te-Se-N-Ni compound and 275 Å thick whose content is 77 atomic percent Te, 13 atomic percent Se, 6 atomic percent N and 4 atomic percent Ni can be formed by sputtering the target of Te-Se-Ni alloy.

4th EMBODIMENT

Figure 2:
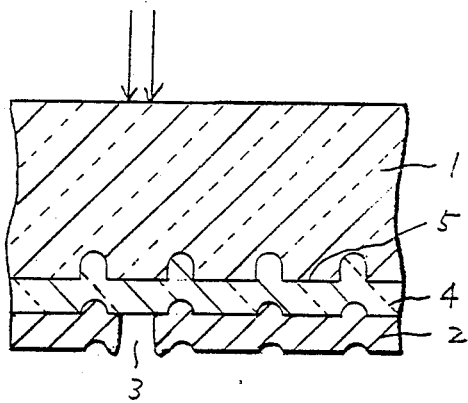
FIG. 2 is a sectional view of an optical recording medium according to another embodiment of the present invention.

FIG. 2 shows another structure of an optical information recording medium according to the present invention which includes an intermediate layer 4 formed between the substrate 1 and the recording layer 2. The intermediate layer 4 is formed on one surface of the substrate 1 by sputtering, the vacuum evaporation or the other method well known in the art. The recording layer 2 of Te-Se-N compound is formed on the intermediate layer 4 in the manner described previously.

The intermediate layer 4 consists of a compound selected from an oxide such as Ce oxide, Mg oxide, Si monooxide, Si dioxide and Sn dioxide; a nitride such as Si nitride, Zr nitride, Cr nitride and Ti nitride; a sulfide such as Zn sulfide; a fluoride such as Ce fluoride, La fluoride, Mg fluoride and rare earth elements fluoride; a carbide such as Zr carbide, Si carbide, Cr carbide and Ti carbide; a boride such as Ti boride; a Co alloy such as Co-Cr and Co-Ta alloy; a metal lower oxide such as Ge lower oxide, Ni lower oxide and Co lower oxide; the mixture of metal and oxide such as the mixture of Te-Se alloy and Co oxide and the mixture of Te-Se alloy and Ni oxide; or an organic compound such as 3, 4, 9, 10-perylene tetracarboxyl dianhydride (PTCDA) and fluorine carbide. The intermediate layer 4 is provided for preventing the excessive expansion of the pit formed in the recording layer 2 by the recording laser beam so that the recording power margin is further improved.

An appropriate thickness of the intermediate layer 4 is variant depending on the material of the intermediate layer 4 as shown in the following Table 4.

TABLE 4

| Material of Intermediate Layer | Thickness of Intermediate Layer (Å) |
| --- | --- |
| $SiO_2$ | 500 |
| $Si_3N_4$ | 100 |
| PTCDA | 120 |
| $NiO_{0.9}$ | 200 |
| ZnS | 100 |
| Co | 3 |
| $Co^{85}Ta^{15}$ (atomic %) | 4 |
| $MgF_2$ | 50 |
| SiC | 60 |
| TiB | 30 |
| polyethylene tetrafluoride | 20 |

As described above, the optical recording medium according to the present invention includes the recording layer of Te-Se-N compound. The recording layer has a high degree of optical recording sensitivity and a wide recording power margin which allows an error of intensity of a recording laser beam. Therefore, the optical recording medium provides excellent performance characteristics when used in a practical optical information recording and reading apparatus.

What is claimed is:

1. An optical information recording medium, in which information is recorded is recorded by an irradiation of a laser beam, said recording medium comprising a substrate and a recording layer disposed on said substrate, said recording layer containing Te, Se and N and being evaporated by said irradiation of said laser beam so as to form pits in said recording layer, the thickness of said recording layer being in a range from 180 to 400 angstroms (Å).

2. The optical information recording medium as claimed in claim 1, said compound of Te, Se, and N being crystallized.

3. The optical information recording medium as claimed in claim 1, a content of N in said compound being in a range from 2 to 10 atomic percent.

4. The information recording medium as claimed in claim 1, a content of Se in said compound being in a range from 10 to 30 atomic percent.

5. The information recording medium as claimed in claim 1, said recording layer further containing at least one element selected from a group consisting of Pb, As, Sn, Ge, Cd, Tl, Sb, S, P, In, Ga, Zn, Bi, Al, Cu, Ag, Mg, Ta, Au and Pd.

6. The information recording medium as claimed in claim 1, said recording layer further containing at least one element selected from a group consisting of Ti, Zr, Hf, Ru, Rh, Os, Ir, Pt, Ni, Co and Fe.

7. The information recording medium as claimed in claim 1, further comprising an intermediate layer disposed between said substrate and said recording layer.

8. The information recording medium as claimed in claim 7, said intermediate layer containing an oxide taken from the group consisting of Ce oxide, Mg oxide, Si monoxide, Si dioxide and Sn dioxide.

9. The information recording medium as claimed in claim 7, said intermediate layer containing a nitride taken from the group consisting of Si nitride, Zr nitride, Cr nitride and Ti nitride.

10. The information recording medium as claimed in claim 7, said intermediate layer containing Zn sulfide.

11. The information recording medium as claimed in claim 7, said intermediate layer containing a fluoride taken from the group consisting of Ce fluoride, La fluoride, Mg fluoride and rare earth elements fluoride.

12. The information recording medium as claimed in claim 7, said intermediate layer containing a carbide taken from the group consisting of Zr carbide, Si carbide, Cr carbide and Ti carbide.

13. The information recording medium as claimed in claim 7, said intermediate layer containing Ti boride.

14. The information recording medium as claimed in claim 7, said intermediate layer containing a Co alloy taken from the group consisting of Co-Cr alloy and Co-Ta alloy.

15. The information recording medium as claimed in claim 7, said intermediate layer containing a metal lower oxide taken from the group consisting of Ge lower oxide, Ni lower oxide and Co lower oxide.

16. The information recording medium as claimed in claim 7, said intermediate layer containing a mixture of metal and oxide taken from the group consisting of a mixture of Te-Se alloy and Co oxide and mixture of Te-Se alloy and Ni oxide.

17. The information medium as claimed in claim 7, wherein said intermediate layer contains an organic compound taken from the group consisting of 3, 4, 9, 10-perylene tetracarboxyl dianhydride and fluorine carbide.

* * * * *